United States Patent [19]

Cuccio et al.

[11] Patent Number: 5,484,063
[45] Date of Patent: Jan. 16, 1996

[54] HDD CARRYING CASE

[75] Inventors: Allen Cuccio, Boulder, Colo.; John Hagerman, Menlo Park, Calif.

[73] Assignee: Maxtor Corporation, San Jose, Calif.

[21] Appl. No.: 227,272

[22] Filed: Apr. 13, 1994

[51] Int. Cl.$^6$ ............................ B65D 73/02; B65D 85/42
[52] U.S. Cl. .................... 206/722; 206/723; 206/724; 206/523; 206/320; 206/594
[58] Field of Search ............................ 206/328, 334, 206/523, 320, 588, 45.23, 45.15, 591, 594, 701, 722, 723, 724, 523, 320

[56] References Cited

U.S. PATENT DOCUMENTS

| | | | |
|---|---|---|---|
| 3,848,735 | 10/1974 | McGee et al. | 206/328 |
| 4,223,368 | 9/1980 | Dattilo | 206/328 |
| 4,241,829 | 12/1980 | Hardy | 206/328 |
| 4,520,079 | 12/1983 | Gliniorz et al. | 206/387 |
| 4,602,715 | 7/1986 | Sarver et al. | 206/523 |
| 4,681,227 | 7/1987 | Tamura et al. | 206/523 |
| 4,828,115 | 5/1989 | Wiegand et al. | 206/576 |
| 4,856,656 | 8/1989 | Sugimoto et al. | 206/523 |
| 5,002,184 | 3/1991 | Lloyd | 206/523 |
| 5,218,510 | 6/1993 | Bradford | 361/220 |
| 5,259,498 | 10/1993 | Weisburn et al. | 206/45.15 |

*Primary Examiner*—David T. Fidei
*Assistant Examiner*—Tara L. Laster
*Attorney, Agent, or Firm*—John R. Wahl

[57] ABSTRACT

A carrying case for a portable hard disk drive. The carrying case is particularly adapted to hold a hard disk drive that complies with the PCMCIA specifications. The case includes a cover that is pivotally connected to a base, so that the cover can be rotated between open and closed positions. Within the base portion of the case is an elastic insert which contains a slot that can receive a drive unit. The elastic insert is constructed to significantly dampen any shock load that is applied to the case and prevent damage to the drive unit.

8 Claims, 2 Drawing Sheets

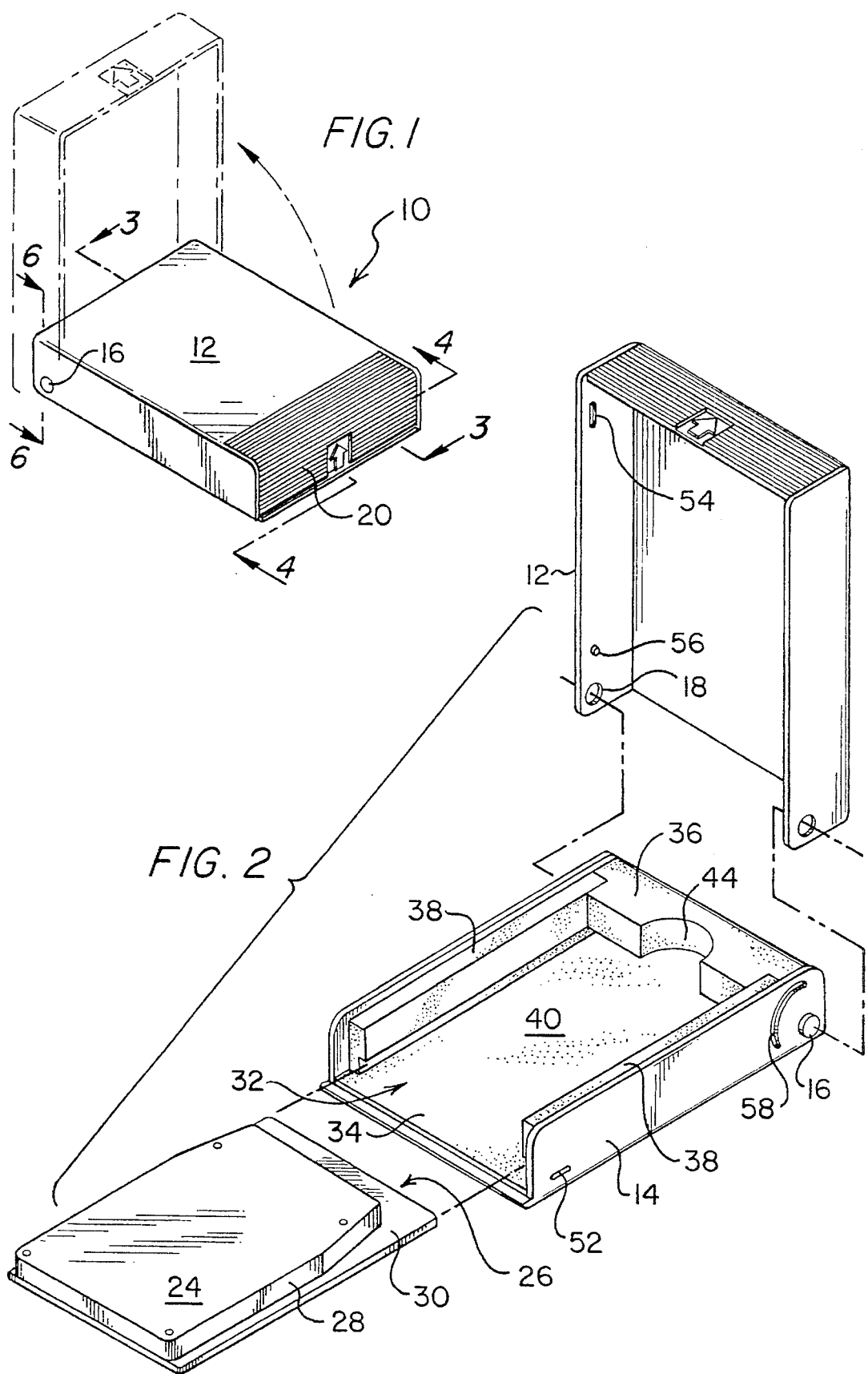

HDD CARRYING CASE

BACKGROUND OF THE INVENTION

1. Field of the Invention

The present invention relates to a carrying case for a portable hard disk drive.

2. Description of Related Art

There has recently been developed portable hard disk drives which comply with the specifications promulgated by the Personal Computer Memory Card International Association (PCMCIA). PCMCIA disk drives are approximately the size of a very thick credit card and contain an electrical connector at one end which mates with a corresponding connector in a host system. The portable nature of PCMCIA type disk drives allow the user to easily carry and plug the drive into various host computers.

Hard disk drives are susceptible to damage when subjected to excessive shock loads. For example, excessive shock loads may damage the actuator arm assembly or the disk of the drive. The portability of a PCMCIA disk drive increases the likelihood of the drive being subjected to shock. This is particularly true, when the drive is being carried or handled by the user. It would be desirable to protect a portable hard disk drive when the drive is being stored or carried outside of a host computer.

SUMMARY OF THE INVENTION

The present invention is a carrying case for a portable hard disk drive. The carrying case is particularly adapted to hold a hard disk drive that complies with the PCMCIA specifications. The case includes a cover that is pivotally connected to a base, so that the cover can be rotated between open and closed positions. Within the base portion of the case is an elastic insert which contains a slot that can receive a drive unit. The elastic insert is constructed to significantly dampen and absorb any shock load that is applied to the case and prevent damage to the disk drive. The elastic insert also prevents the disk drive from moving within the case and damaging the same. The hard drive can be loaded into the case by rotating the cover into the open position and inserting the drive into the slot of the insert. The disk drive is then enclosed by rotating the cover back into the closed position.

BRIEF DESCRIPTION OF THE DRAWINGS

The objects and advantages of the present invention will become more readily apparent to those ordinarily skilled in the art after reviewing the following detailed description and accompanying drawings, wherein:

FIG. 1 is a perspective view of a carrying case of the present invention;

FIG. 2 is an exploded view of a PCMCIA hard disk drive and a carrying case in an open position;

DETAILED DESCRIPTION OF THE INVENTION

Figure 3:
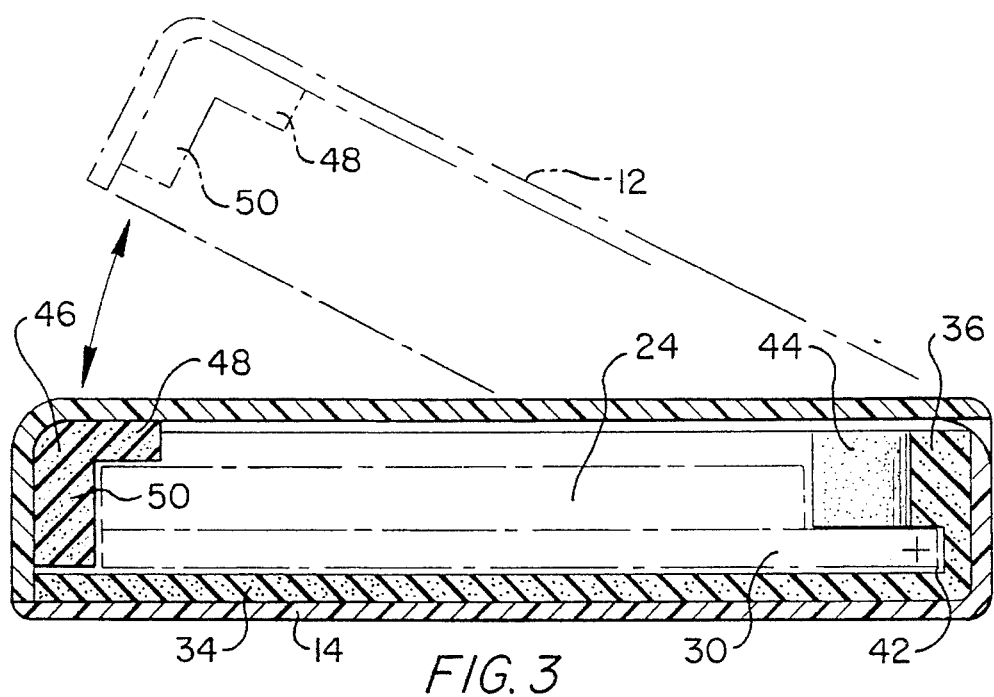
FIG. 3 is a cross sectional view taken at line 3—3 of FIG. 1.
Figure 4:
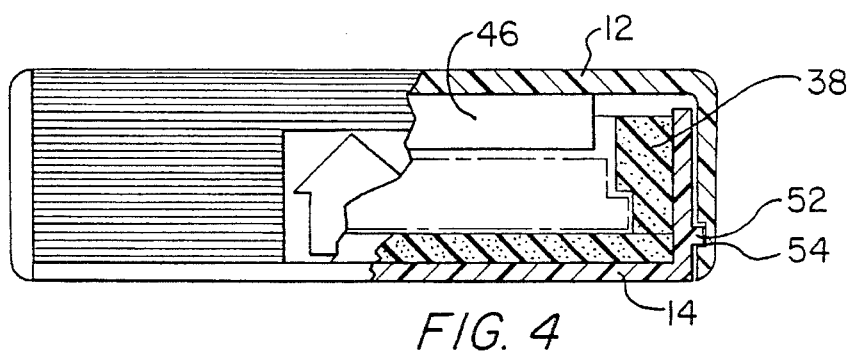
FIG. 4 is a cross-sectional view taken at line 4—4 of FIG. 1.

Referring to the drawings more particularly by reference numbers, FIGS. 1–6 show a carrying case 10 of the present invention. The case 10 has a cover 12 that is pivotally connected to a base 14 by a pair of pins 16. The pins 16 extend from the base 14 and into corresponding holes 18 in the cover 12. The cover 12 can rotate between an open position and a closed position. The cover 12 and base 14 are preferably constructed from a hard plastic material. One end of the cover 12 may have ridges 20 to increase the friction of the surface and allow the user to more readily open the case 10. The end of the cover 12 may also have an arrow which indicates the direction of rotation to open the case 10.

The case 10 is used to hold and carry a portable hard disk drive 24. The disk drive 24 preferably complies with the specifications of the PCMCIA. In the preferred embodiment, the disk drive 24 has the outer dimensions of approximately 10×54×85 millimeters, which conform to a type III PCMCIA card. One end of the disk drive contains an electrical connector 26 which can be plugged into a corresponding connector in a host system. The disk drive also has a disk portion 28 which extends from a lip portion 30 of the drive. Although a type III PCMCIA hard disk drive card is described and shown, it is to be understood that other types of hard disk drives can be used with the carrying case 10 of the present invention, including other non-PCMCIA portable drives.

Attached to the base 14 of the case 10 is an elastic insert 32. The insert 32 has a bottom wall 34, a back wall 36 and a pair of side walls 38. The walls define a slot 40 which can receive the hard disk drive 24. As shown in FIG. 3, the back wall 36 is preferably separated from the bottom wall 34 by a gap 42 that receives the lip portion 30 of the disk drive 24. The back wall 36 captures the lip portion 30 and prevents vertical movement of the drive 24. Additionally, the bottom 34 and back 36 walls absorb shock loads that are applied to the end of the base 14. The distance between the side walls 38 is preferably less than the width of the disk drive 24, so that the drive slightly compresses the elastic walls 38. The compressive fit between the disk drive 24 and the walls 38 insures that the drive 24 does not laterally move within the case. Additionally, the elastic side walls 38 absorb shock loads that are applied to the sides of the case. The back wall 36 preferably has a groove 44 which allows the user to insert a finger and remove the drive from the case 10.

Attached to the inside of the cover 12 is an elastic pad 46. The pad 46 includes a first portion 48 that engages the top of the disk drive 24 and a second portion 50 which engages the end of the drive. The first portion 48 further prevents vertical movement of the drive and absorbs any shock applied to the top of the cover 12. The second portion 50 further prevents lateral movement of the drive and absorbs shock loads applied to the end of the cover 12.

The insert is constructed from an elastic material which will absorb and dampen any shock loads that are applied to the case. A shock load may occur, for example, if the case and enclosed drive are dropped by the user. In the preferred embodiment, the elastic material is a foam rubber. Although a foam rubber is described, it is to be understood that other elastic materials and thicknesses of material can be used in the present invention.

Figures 5, 6:
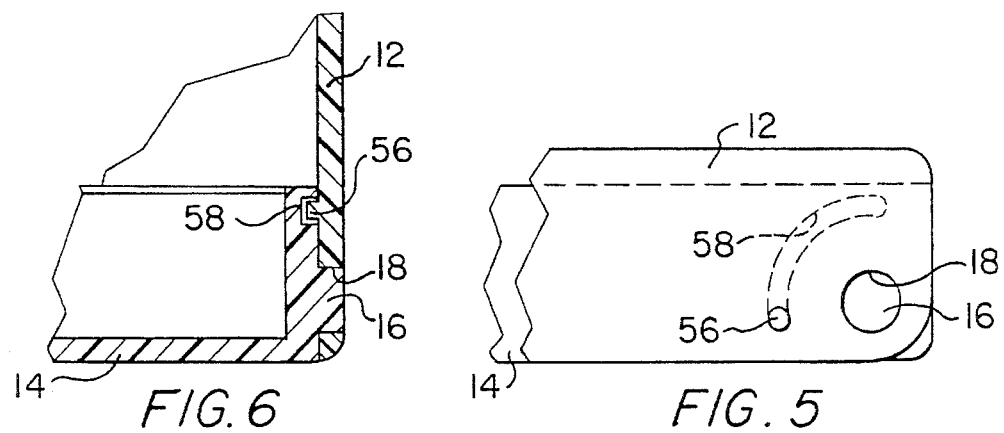
FIG. 5 is a sectional side view of the case.
FIG. 6 if a cross-sectional view taken at line 6—6 of FIG. 1.

Referring to FIG. 2, the base 14 may have a pair of detents 52 which snap into corresponding grooves 54 in the cover 12 when the cover is in the closed position. The detents 52 lock the cover 12 in the closed position and prevent the case 10 from becoming inadvertently opened. As shown in FIGS. 5 and 6, the cover 12 may have a pair of pins 56 which travel along corresponding slots 58 in the base 14 and limit the movement of the cover 12 in the open position.

To load the disk drive 10, the cover 12 is rotated into the open position. The disk drive 24 is then fully inserted into the slot 40 of the insert 32. The cover 12 is then rotated into the closed position to enclose the drive unit 24. The case 10 of the present invention provides a container that allows the user to readily store and carry a portable hard disk drive. The hardened plastic base and cover prevent damage to the case. The elastic insert absorbs and dampens any shock applied to the case, and thus prevent or at least reduce the amount of damage to the drive.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A carrying case for a portable hard disk drive, comprising:

a base;

a cover pivotally connected to said base such that said cover can move between an open position and a closed position; and, an elastic insert attached to said base and having a slot which receives a hard disk drive, wherein said insert has a back wall and a pair of side walls that extend from a bottom wall, said back, said side and said bottom walls defining said slot, said back wall being separated from said bottom wall by a gap.

2. The carrying case as recited in claim 1, further comprising an elastic pad attached to said cover.

3. The carrying case as recited in claim 1, wherein said base has a detent that snaps into a corresponding groove in said cover when said cover is in the closed position.

4. The carrying case as recited in claim 1, wherein said cover has a pin that travels along a corresponding slot in said base, when said cover moves between the open and closed positions.

5. A carrying case for a portable hard disk drive, comprising:

a base;

a cover pivotally connected to said base such that said cover can move between an open position and a closed position; and, an elastic insert attached to said base, said insert having a slot which receives a hard disk drive, said insert having a back wall and a pair of side walls that extend from a bottom wall, said back, said side and said bottom walls defining said slot, wherein said back wall has a groove.

6. A carrying case for a portable hard disk drive, comprising:

a base;

a cover pivotally connected to said base such that said cover can move between an open position and a closed position;

an elastic bottom wall mounted to said base;

an elastic back wall that has a groove and is separated from said bottom wall by a gap;

a pair of side walls that extend from said bottom wall, said bottom, said back and said side walls defining a slot that receives a hard disk drive; and, an elastic pad attached to said cover.

7. The carrying case as recited in claim 6, wherein said base has a detent that snaps into a corresponding groove in said cover when said cover is in the closed position.

8. The carrying case as recited in claim 7, wherein said cover has a pin that travels along a corresponding slot in said base, when said cover moves between the open and closed positions.

* * * * *